United States Patent [19]

Lackinger

[11] Patent Number: 4,608,454

[45] Date of Patent: Aug. 26, 1986

[54] TENSION RESISTING ELECTRICAL CABLE GLAND

[76] Inventor: Franz Lackinger, 9 Sligo Road, Kenmare, Krugersdorp, Transvaal Province, South Africa

[21] Appl. No.: 560,833

[22] Filed: Mar. 8, 1984

Related U.S. Application Data

[63] Continuation-in-part of Ser. No. 543,888, Oct. 23, 1983, abandoned.

[51] Int. Cl.$^4$ ................................ H02G 3/06
[52] U.S. Cl. .................... 174/65 SS; 285/343
[58] Field of Search ............. 174/65 SS, 65 R; 285/161, 158, 343, 353, 355, 403, 404; 411/393; 403/362, 366

[56] References Cited

U.S. PATENT DOCUMENTS

| | | | |
|---|---|---|---|
| 1,737,242 | 9/1928 | Hooley | 285/158 |
| 2,564,302 | 12/1948 | Fraser | 174/65 SS |
| 3,352,961 | 1/1965 | Simon | 174/65 R |
| 3,667,783 | 7/1970 | Sotolongo | 174/65 SS |
| 3,993,330 | 11/1976 | Göransson | 285/158 |

FOREIGN PATENT DOCUMENTS

| | | | |
|---|---|---|---|
| 0039862 | 11/1981 | European Pat. Off. | 174/65 SS |
| 57-01296 | 4/1982 | Japan | 174/65 SS |
| 792062 | 12/1980 | South Africa . | |

Primary Examiner—Arthur T. Grimley
Assistant Examiner—D. A. Tone
Attorney, Agent, or Firm—Stevens, Davis, Miller & Mosher

[57] ABSTRACT

An electrical cable gland is provided which can be effectively clamped to metal strip types of armouring of an armoured electrical cable to effectively resist tension applied to such cable. The electrical cable gland includes at least two, and preferably three gripping dogs movable inwardly towards each other to effectively grip such metal strip armouring preferably between the dogs and on inner supporting sleeve forming part of the gland. Movement of the dogs can be by co-operating tapered surfaces on the dogs and body of the gland with the surfaces being axially movable relative to each other or by radially extending screw threaded fasteners passing through the wall of the body. An inwardly deformable, electrically conductive contact ring can be included, where required for making electrical contact with a lead or other conductive sheath.

14 Claims, 4 Drawing Figures

TENSION RESISTING ELECTRICAL CABLE GLAND

This is a continuation-in-part of application Ser. No. 543,888, filed Oct. 20, 1983 and now abandoned.

FIELD OF THE INVENTION

This invention relates to tension resisting electrical cable glands and, more particularly, to cable glands adapted for use on armoured cables wherein the armouring is other than a multitude of armour wires following a large pitch helical path around the electrical cable and on the inside of an outer sheath therefor.

More particularly, but not exclusively, the invention is concerned with the provision of an electrical cable gland adapted for use in conjunction with armoured cables having armouring in the form of flat or grooved metal strip wound helically around the outside of one sheath of an electrical cable and wherein the cable has, in addition, separated from the armouring, a conductive sheath of deformable metal such as, for example, lead.

BACKGROUND TO THE INVENTION

As is well known in the art electrical cables having a multitude of helically wound armour wires can easily be anchored against tensile forces exerted on the cable by means of the well known armour clamp comprising a cone and co-operating complementary thimble between which the armour wires are clamped firmly in use.

However, where the armouring assumes the form of a metal strip, which may be grooved so that co-operating edge portions overlap to form a continuous armour sheath, such a form of armour clamp is inappropriate and, indeed, ineffective. Where such grooves are not present two flat strips can be employed with the outer one covering a helical gap between successive convolutions of the inner one.

In an effort to solve this problem there has been proposed, in South African Pat. No. 79/2062, a cable gland in which a deformable lead ring is deformed to contact with the inner regions of grooves provided in an armouring strip of a grooved configuration in an effort to anchor such armouring axially. However, in view of the deformable nature of the lead, anchoring is not effective and the armouring can, in fact, be pulled axially from the cable gland. In that particular case the gland is made for co-operation with a cable having an inner lead sheath and the lead sheath is soldered to a body of lead provided in the cable gland.

This latter arrangement effectively connects, electrically, the gland with the lead sheath. However, when such a gland must be removed, for example for the purpose of servicing or repairing electrical equipment served by a cable associated with a gland of this nature, the lead and solder must be melted before the cable can be released from the cable gland. This often involves the use of a flame which is totally inconvenient in the case where such flame represents a fire or explosion hazard.

It is the object of this invention to provide an improved cable gland of the above described nature in which a vastly improved axial holding force is afforded the armouring of a cable operatively associated therewith and, in the case where a cable has a lead sheath, a more simple electrical connection is effected to the lead sheath.

SUMMARY OF THE INVENTION

In accordance with this invention there is provided an electrical cable gland comprising a body having a passage therethrough, and an armour clamp assembly comprising at least two gripping dogs spaced apart about the circumference of the cable gland and having means associated therewith for urging the gripping dogs radially inwardly towards one another.

Further features of the invention provides for the gripping dogs to form an incomplete ring about the passage in the body; for there to be three circumferentially spaced gripping dogs forming part of said armour clamp assembly; for there to be an inner sleeve forming part of the cable gland and adapted to have the armour strip clamped to the outer surface thereof by the gripping dogs; for the cable gland to have an outer seal arrangement adapted for sealingly engaging the outer sheath of an electrical cable; for the cable gland to embody, where required, an inwardly deformable conductive contact ring for engaging a lead or other conductive sheath to make electrical contact therewith and for the electrical cable gland to have a screw threaded spigot and nut assembly for clamping it in an aperture in an operative position.

Still further features of the invention provide for the means for urging the gripping dogs radially inwardly to include tapered surfaces associated with the dogs and co-operating surfaces associated with the body of the cable gland; for said co-operating tapered surfaces to be operable to move the dogs inwardly towards each other upon relative rotation of two screw threaded and inter-engaged body parts of the cable gland; and for the gripping dogs to be inter-connected by a deformable and optionally flexible ring or circlip.

In an alternative preferred embodiment of the invention the means for urging the gripping dogs radially inwardly comprise one or more screw threaded fasteners or the like extending generally radially through a side wall of the cable gland body and co-operating at the inner ends thereof with the gripping dogs. In such an arrangement the gripping dogs can be held captive but rotatable relative to the screw threaded fasteners which can, conveniently, be grub screws. It is envisaged that one or two screw threaded fasteners will be sufficient for each gripping dog.

Where the armouring of a cable has a grooved configuration which results in a helical groove or rib extending along the length of the armouring, the surfaces of the gripping dogs can be shaped complementary thereby ensuring an effective clamping thereof.

BRIEF DESCRIPTION OF THE DRAWINGS

In order that the invention may be more fully understood three different embodiments of the invention will now be described with reference to the accompanying drawings in which.

DETAILED DESCRIPTION WITH REFERENCE TO THE DRAWINGS

Figure 1:
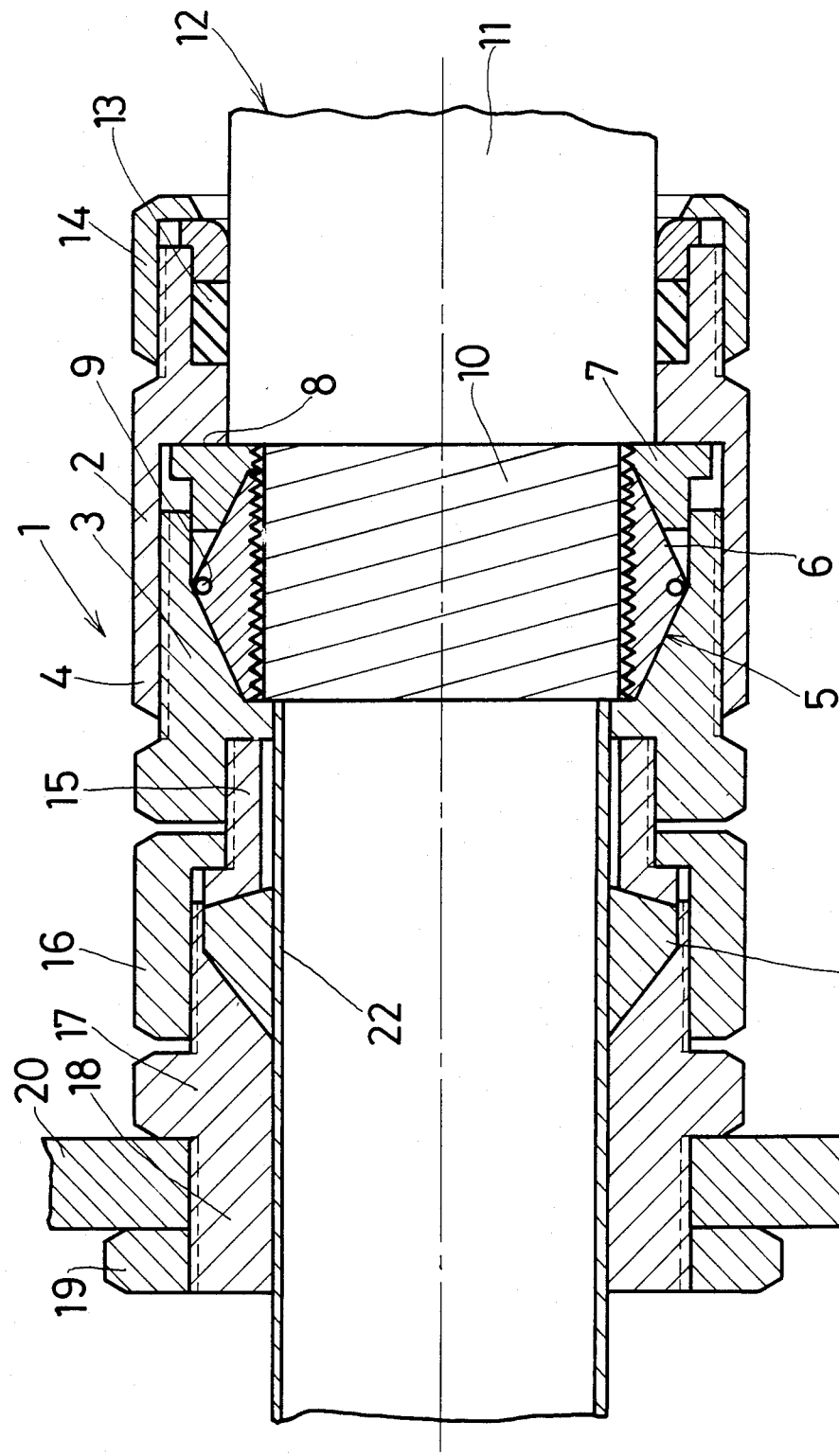
FIG. 1 is a longitudinal sectional view taken through one embodiment of the invention.

In the embodiment of the invention illustrated in FIG. 1 a cable gland, generally indicated by numeral 1, comprises a first and a second body part 2 and 3 respectively. The first body part has an internally screw threaded socket formation at its one end region 4 and this screw threaded socket accommodates a differential nut 3 defining the second part of the body.

The inner surface of the differential nut has a truncated conical surface 5 co-operating with complementarily shaped surfaces on three equally angularly spaced gripping dogs 6 positioned within the body of the cable gland. These gripping dogs define a discontinuous ring with the spaces between them being sufficient to allow them to move inwardly to an extent required.

The cross-sectional shape of each of the gripping dogs is that of an isosceles triangle whereof the one side defines said co-operating surface operatively in contact with the truncated conical surface of the differential nut, and the other of such equal sides co-operates with a complementary surface of a clamping insert 7 which abuts a shoulder 8 in the bore through the gland body. The arrangement is such that upon rotation of the differential nut relative to the first body part 2 the gripping dogs can be urged radially inwardly as a result of co-operation between the surfaces of the differential nut and gripping dogs on the one hand and the clamping insert and gripping dogs on the other.

As a matter of convenience the three gripping dogs, which are substantially equally circumferentially spaced about the bore through the body of the cable gland, are inter-connected by a resilient ring 9 to which the dogs are attached at their radially outer-most positions.

It will be understood that, in use a cable having grooved strip armouring 10 on the inside of an outer sheath 11 can have its armouring gripping securely by the dogs. This is achieved simply by inserting the prepared end of the cable 12 into the cable gland and rotating the differential nut relative to the first body part of effect an inward clamping action of the gripping dogs onto the armour strip. In order to ensure effective engagement the inner surface of the gripping dogs can be knurled or otherwise adapted to provide proper tension resisting engagement.

The cable gland as above described can be provided with additional features as described below.

In this particular case an outer seal 13 is provided at the opposite end of the first body part and this seal is axially compressable, in order to cause it to bulge radially inwardly, by means of a union nut 14 co-operating with a screw threaded outer surface to this end of the first body part.

The opposite end of the body, in fact the differential nut 3, is provided with a screw threaded socket which receives an outwardly flanged fitting 15 wherein the outwardly directed flange co-operates with the flange of a union nut 16. The union nut, in turn, co-operates with an externally screw threaded spigot of a third body part 17 of the cable gland and this body part 17 has a spigot 18 on its opposite end for co-operation with either a nut 19 on the opposite side of a perforated wall 20 or, indeed, with a suitably screw threaded aperture in a wall of an electrical connection box for example.

The flanged end of the fitting 15 and the adjacent interior of the third body part 17 define a housing for a contact ring 21 of deformable metal such as, for example, lead. In this case the ring has a solid cross section as illustrated. The surfaces of the third body part and the flanged end of the fitting are both formed to truncated conical shapes such that upon rotation of the union nut to urge the fitting into the third body part the contact ring 21 is deformed radially inwardly into firm electrical contact with, for example, a lead sheath 22 in the case of a lead sheathed, and armoured cable.

It will be understood that, with the above described arrangement, a highly effective armour anchor is achieved. It is to be noted, as a result of the co-operating inclined surfaces of the clamping ring 7 and the gripping dogs 6, any axial force tending to pull the cable out of the gland will only result in an increased gripping action of the gripping dogs.

The particular arrangement employed for the electrical contact ring enables the union nut to be released and the entire cable can be withdrawn, together with the contact ring which will be substantially permanently fixed to the lead sheath. The disadvantages attendant on the soldering of the lead sheath to the body of the electrical cable gland are thus avoided.

Figure 2:
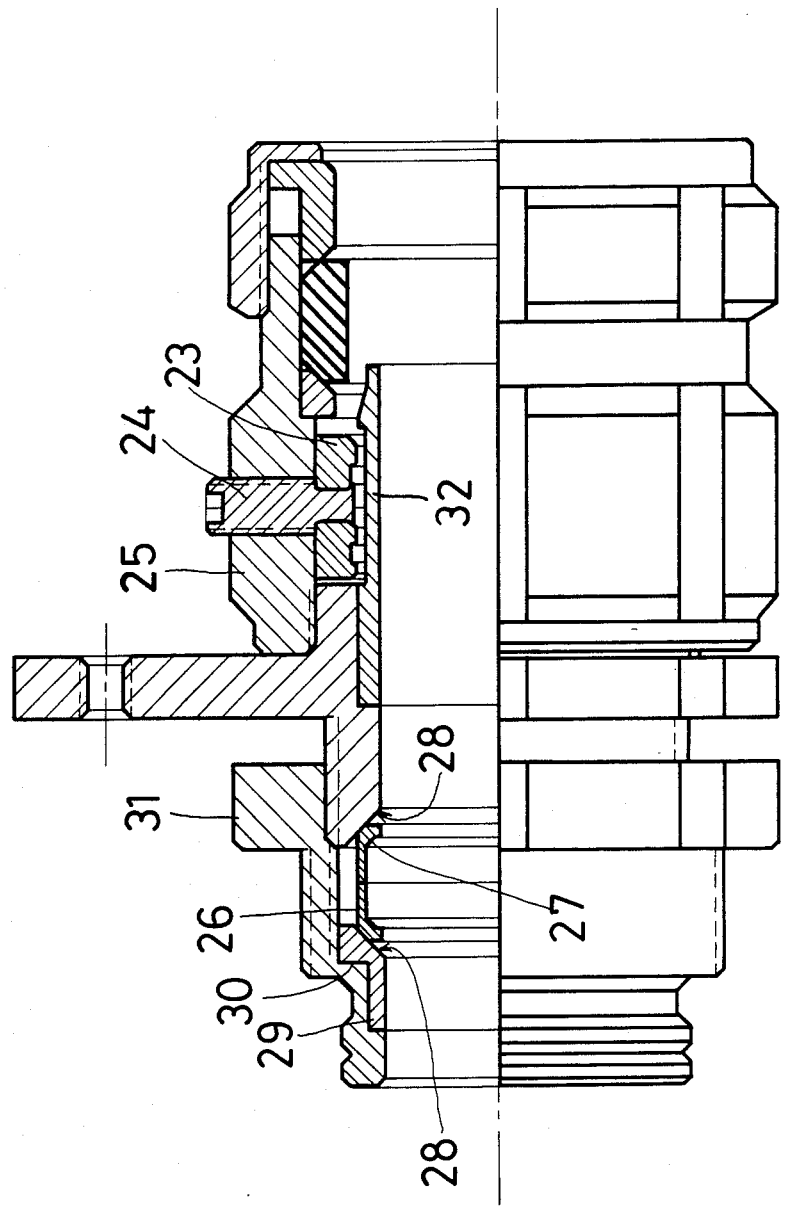
FIG. 2 is a half sectioned elevation taken through an alternative embodiment of the invention in the inoperative condition thereof.

It will be understood that numerous variations may be made to the above described embodiment of the invention without departing from the scope hereof. In particular, as illustrated in FIG. 2, the gripping dogs need not be adapted for inward movement by way of conical or tapered surfaces. In the embodiment illustrated in FIG. 2 each gripping dog 23 is attached to, and operable by, radially inwardly extending grub screws 24 passing through the wall of the body 25. The body 25, as a result, need not be made as two parts, namely the differential nut and the first part 2, but can be made as a single part as illustrated in FIG. 2.

It will be understood that the gripping dogs, as in the above described example, are provided with suitable surfaces for engagement with the armouring of an armoured cable.

Also in this embodiment of the invention an internal support sleeve 32 is provided for location on the inside of the strip armouring so that the latter can be firmly clamped between the sleeve and gripping dogs. There is thus no chance of the lead sheath collapsing.

All that is required in order to operatively install such a cable gland is to introduce the prepared cable end into the gland with the strip on the outside of the sleeve and, by rotating the grub screws 24, to clamp the armouring firmly between the gripping dogs 23 and the support sleeve 32.

In the illustrated embodiment of the invention one grub screw is provided for each gripping dog 23. If required there could be two with the grub screws being spaced apart in the axial or circumferential direction.

It is to be noted, that each gripping dog is preferably held captive relative to the inner ends of the grub screws so as to avoid any problems or disadvantages which may, otherwise, result from loose gripping dogs being employed.

Figure 3:
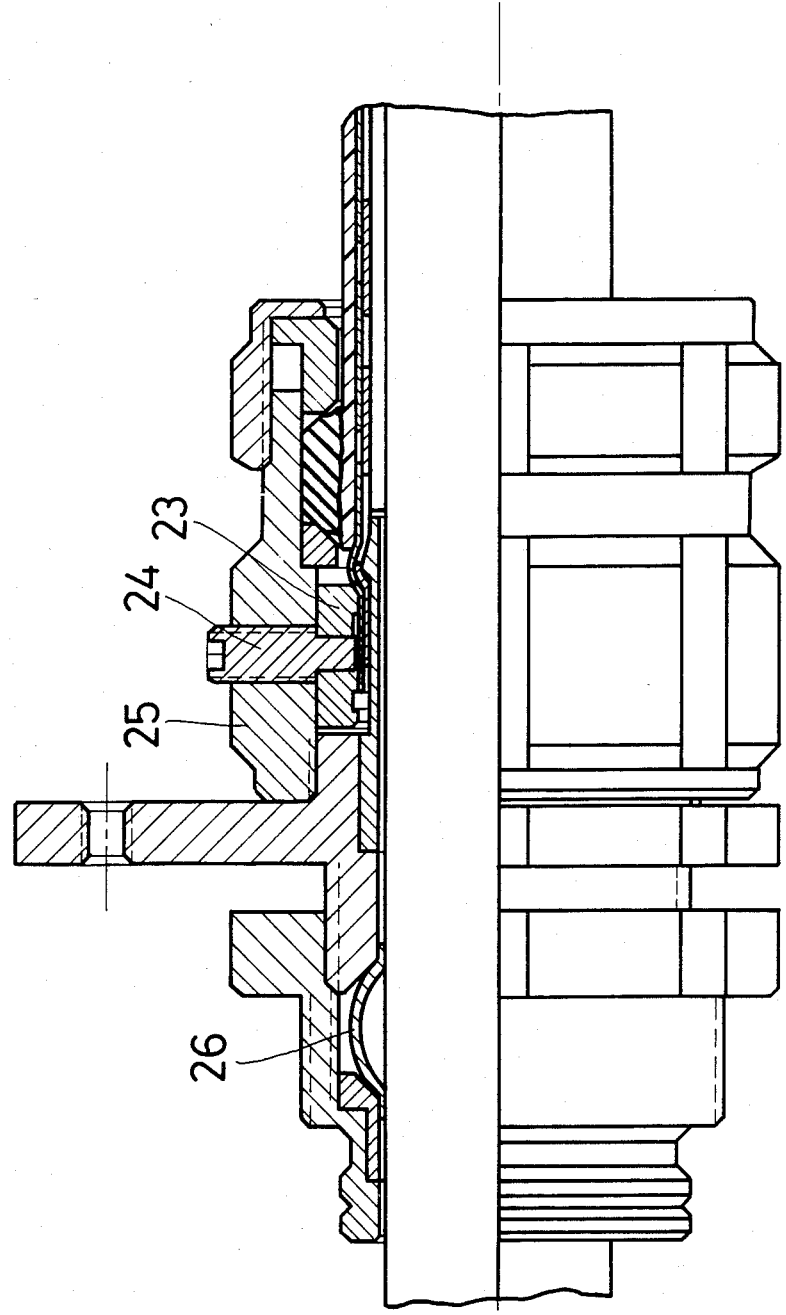
FIG. 3 is a similar view of the embodiment of FIG. 2 but in the operative condition thereof; and, FIG. 4 is a half sectioned elevation of a gland made particularly for use with a cable having grooved or channel shaped strip armouring resulting in a deep helical groove or rib extending along the length of the armouring.

A further variation with respect to the embodiment illustrated in FIG. 1 is that the contact ring 26 is made to a channel shape in cross-section with the flanges 27 inclined outwardly in symmetrical manner as illustrated in FIG. 2. The flanges co-operate with complementarily inclined surfaces 28 of the body and a fitting 29 co-operating with a shoulder 30 in a union nut 31. Rotation of the union nut, in use causes the flange edges to dig into the lead sheath and the shape of the channel to deform to as shown in FIG. 3.

Numerous other variations may be made to the embodiments of the invention described above without departing from the scope thereof which is limited only to the provision of gripping dogs for firmly engaging the armouring of a cable of the general nature described. Also, it will be noted, that in instances where no lead sheath is provided, the contact ring can be totally omitted in which case the differential nut can receive, or be made integral with, an externally screw threaded spigot for attachment to the perforated wall of an electrical connection box for example.

Figure 4:
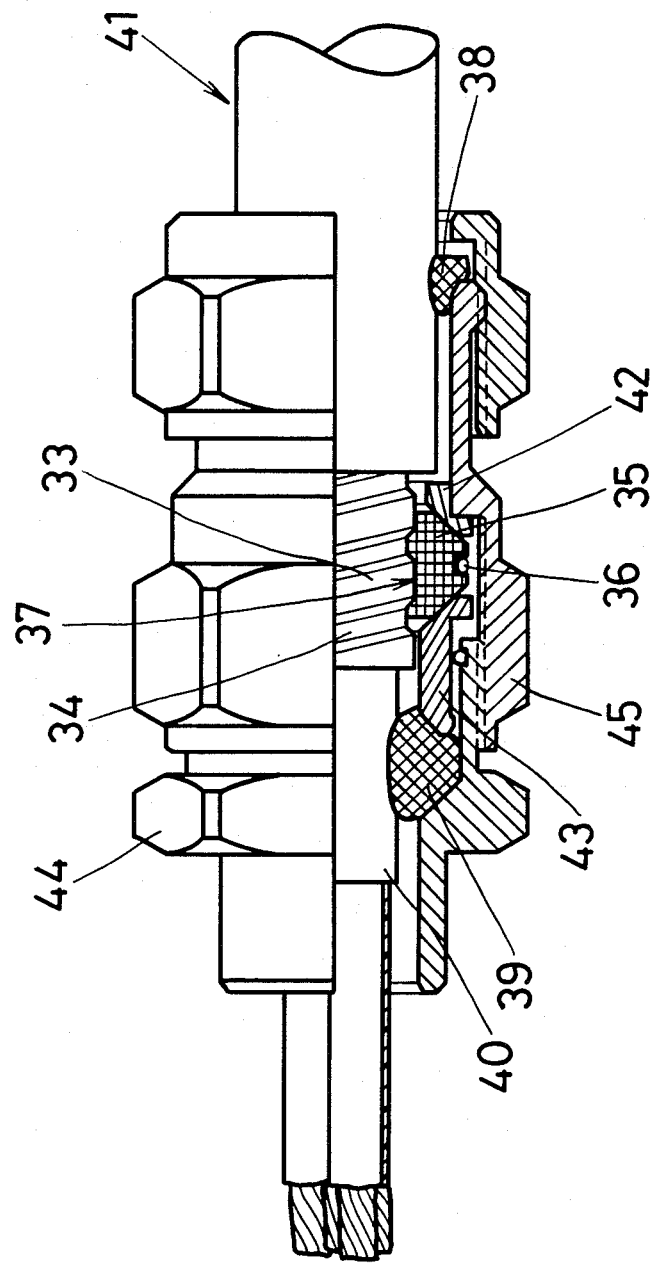

Such variation is illustrated in the embodiment of FIG. 4 of the drawings. In FIG. 4 there is illustrated, partly in section and longitudinal elevation, a further embodiment of the invention particularly adapted for use with electrical cables having a helically wound strip as armouring therefor, but wherein the strip is made to a channel shape in cross section.

As illustrated in FIG. 4, a cable gland which omits the contact ring, but in its place has an inner seal, is illustrated. In this case the armouring 33 is of channel shape in cross-section with one flange extended to bridge the gap between successive convolutions, and such gap defines deep, helical grooves 34.

In order to ensure that adequate tension resistance is present the gripping dogs 35, which are held together by a resilient ring 36 as described above, have their inner surfaces 37 shaped to conform to the grooved outer surface of the armouring. In such a case, when the gripping dogs are firmly engaged with the outer surface it is impossible for the armouring to pull axially out of the gripping dogs.

In cases where such armouring, as is often the case in practice, is made of aluminum, steel gripping dogs can be employed.

This cable gland also employs an outer seal 38 of similar construction to that described above and an inner seal 39 for co-operation with the inner electrically insulating sheath 40 of the cable 41.

A simplified construction internally is also illustrated where the gripping dogs have tapered surfaces of the general type described above and one of which is carried on a clamping insert 42 of the general type described above. The other tapered surface for co-operation with the gripping dogs is provided by an axially movable intervening member 43, co-operating with the gripping dogs at one end, and with the inner seal 39 at its other end. This intervening member is held captive relative to the differential nut 44 whereby, as in the above described embodiments of the invention, axial movement of the differential nut relative to the main body part 45 is achieved. Such axial movement compresses both the inner seal 39 so that it bulges inwardly into contact with the inner sheath 40 and also urges the gripping dogs 35 inwardly.

It will be understood that as the dogs move inwardly they will adjust themselves axially in position so that the co-operating formations on the surface 37 engage in the grooves 34.

Once the cable gland has been tightened in position, and the outer seal 38 rendered operative, the cable gland can be attached to an electrical connection box or the like in the usual way.

It will be understood that any suitable co-operating formations may be provided for the gripping dogs to co-operate with, or simply engage the outer surface of the armouring of the cable. It will be noted, in addition, that with this cross-sectional shape of armouring, no inner sleeve is necessary in order to support the armouring where the gripping dogs are urged radially inwardly.

The invention therefore provides a simple yet highly effective tension resisting cable gland for use on cables having helically wound, optionally grooved, strip armouring.

What I claim as new and desire to secure by Letters Patent is:

1. An electrical cable gland comprising a body having a passage therethrough, and an armour clamp assembly comprising at least two gripping dogs spaced apart about the circumference of the cable gland and being individually movable toward each other by screw threaded fasteners extending through a side wall of the cable gland in a roughly radial direction, with the gripping dogs being held captive but rotatable on the inner ends of the fasteners.

2. An electrical cable gland comprising a body having a passage therethrough, and an armour clamp assembly comprising at least two gripping dogs spaced apart about the circumference of the cable gland and having means associated therewith for urging the gripping dogs radially inwardly towards one another including an inner support sleeve for location on the inside of the armouring opposite the gripping dogs and such sleeve is adapted to have the armouring clamped thereto by the gripping dogs; said gland having an outer seal adapted for sealingly engaging the outer sheath of an electrical cable.

3. An electrical cable gland as claimed in claim 2 in which the gripping dogs form an incomplete ring and each of such gripping dogs is movable radially inwardly towards each other.

4. An electrical cable gland as claimed in claim 3 in which there are three circumferentially spaced gripping dogs forming part of the armour clamp assembly.

5. An electrical cable gland as claimed in claim 2 in which a screw threaded spigot and co-operating nut are provided in the body for clamping it in an aperture in an operative position.

6. An electrical cable gland as claimed in claim 2 in which the gland is adapted for use with a cable having armouring which defines a helically extending deep groove or rib and the gripping surfaces of the gripping dogs are shaped complementarily to engage in the grooves or between the ribs.

7. An electrical cable gland comprising a body having a passage therethrough, and an armour clamp assembly comprising at least two gripping dogs spaced apart about the circumference of the cable gland and having means associated therewith for urging the gripping dogs radially inwardly towards one another and axially spaced therefrom, an inwardly deformable, electrically conductive, contact ring adapted to contact, in use, an electrically conductive sheath of a cable.

8. An electrical cable gland as claimed in claim 7 in which the gripping dogs have outer tapered surfaces co-operating with complementary surfaces associated with the body of the cable gland and means for moving the tapered surfaces and complementary surfaces axially relative to each other to promote radial movement of the gripping dogs relative to each other, said surfaces and associated means for moving same constituting the means for urging the gripping dogs radially inwardly towards each other.

9. An electrical cable gland as claimed in claim 8 in which the means for moving the tapered surfaces and complementary surfaces axially relative to each other are co-operating screw threads on two inter engaged body parts of the cable gland.

10. An electrical cable gland as claimed in claim 8 in which the gripping dogs are provided with two oppositely tapered surfaces co-operating in each case with complementary surfaces associated with the body.

11. An electrical cable gland as claimed in claim 7 in which the gripping dogs are interconnected by a deformable ring or circlip.

12. An electrical cable gland as claimed in claim 7 in which the contact ring has a channel shape in cross-section with the edges of the flanges thereof adapted to contact said sheath.

13. An electrical cable gland as claimed in claim 7 in which the contact ring has tapered or conical surfaces co-operating with complementary surfaces on the body and means are provided for promoting relative axial movement of such surfaces to effect inward deformation of the contact ring.

14. An electrical cable gland comprising a body having a passage therethrough, and an armour clamp assembly comprising at least two gripping dogs spaced apart about the circumference of the cable gland and having means associated therewith for urging the gripping dogs radially inwardly towards one another;

an inner support sleeve on the inside of the gripping dogs, such sleeve being adapted to have the armouring clamped thereto by the gripping dogs; and axially spaced therefrom an inwardly deformable, electrically conductive, contact ring adapted to contact, in use, an electrically conductive sheath of a cable.

* * * * *